United States Patent
Spano et al.

(10) Patent No.: US 10,227,787 B2
(45) Date of Patent: Mar. 12, 2019

(54) TIE DOWN ANCHOR

(71) Applicant: Emergency Universal Shelter Alliance, LLC DBA EUSA, LLC, Memphis, TN (US)

(72) Inventors: Dawson Spano, Maggie Valley, NC (US); Charles King, III, Germantown, TN (US)

( * ) Notice: Subject to any disclaimer, the term of this patent is extended or adjusted under 35 U.S.C. 154(b) by 0 days.

(21) Appl. No.: 15/194,536

(22) Filed: Jun. 27, 2016

(65) Prior Publication Data

US 2016/0305146 A1 Oct. 20, 2016

Related U.S. Application Data

(62) Division of application No. 14/035,404, filed on Sep. 24, 2013, now Pat. No. 9,376,829.

(51) Int. Cl.
*E04H 9/14* (2006.01)
*E02D 5/80* (2006.01)

(52) U.S. Cl.
CPC .............. *E04H 9/14* (2013.01); *E02D 5/801* (2013.01)

(58) Field of Classification Search
CPC .................................. E04H 9/14; E02D 5/801
See application file for complete search history.

(56) References Cited

U.S. PATENT DOCUMENTS

| | | | | |
|---|---|---|---|---|
| 3,848,367 A | * | 11/1974 | Barnes | B60P 3/36 52/157 |
| 3,856,265 A | * | 12/1974 | Foster | F16G 11/12 24/269 |
| 3,871,142 A | * | 3/1975 | Abbott | E02D 5/801 52/149 |
| 4,138,806 A | * | 2/1979 | Miller | E04B 1/34347 52/149 |
| 4,856,265 A | * | 8/1989 | Wolf | A01D 34/71 56/320.2 |
| 5,819,477 A | * | 10/1998 | Gaffney | E04H 9/14 135/115 |
| 8,844,209 B1 | * | 9/2014 | Oliver | E02D 27/50 52/157 |
| 2002/0083660 A1 | * | 7/2002 | Oliver | E02D 5/801 52/169.9 |

\* cited by examiner

*Primary Examiner* — Jeanette E Chapman
(74) *Attorney, Agent, or Firm* — Baker, Donelson, Bearman, Caldwell & Berkowitz, PC

(57) ABSTRACT

We disclose a portable protection shelter that may be easily transported and set up as needed. The shelter provides protection from deadly weather, including storms, hail, hurricanes, and tornados. Additionally, it may be used as a survival pod or as protection from assailants or aggressive animals. The shelter can be transported as required, including through doors, and assembled and disassembled on demand using common handheld tools.

2 Claims, 6 Drawing Sheets

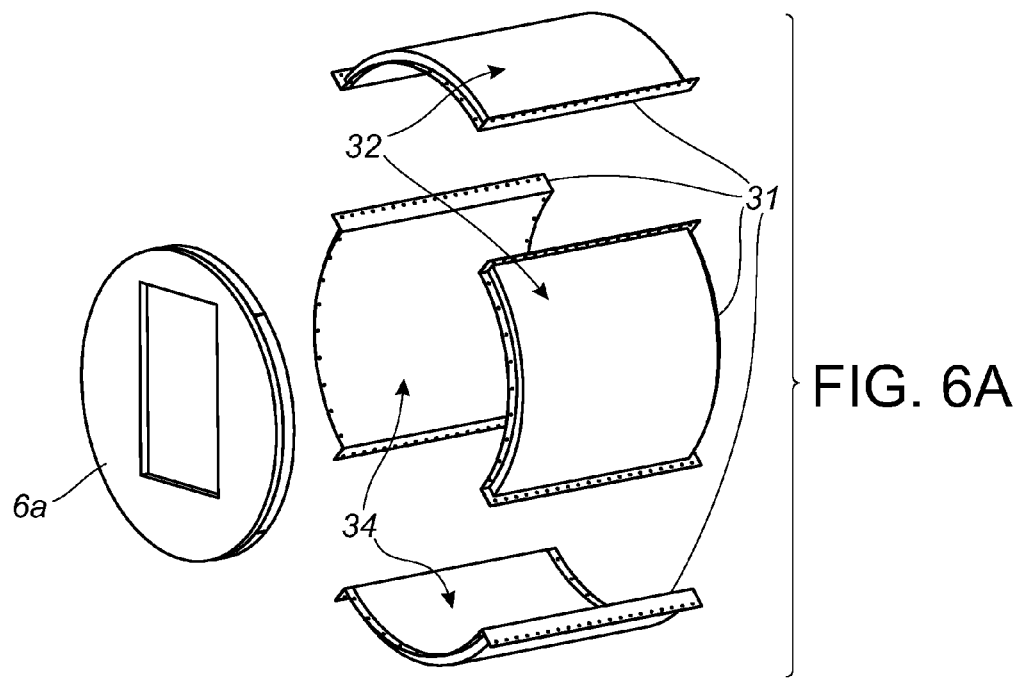
FIG. 6A
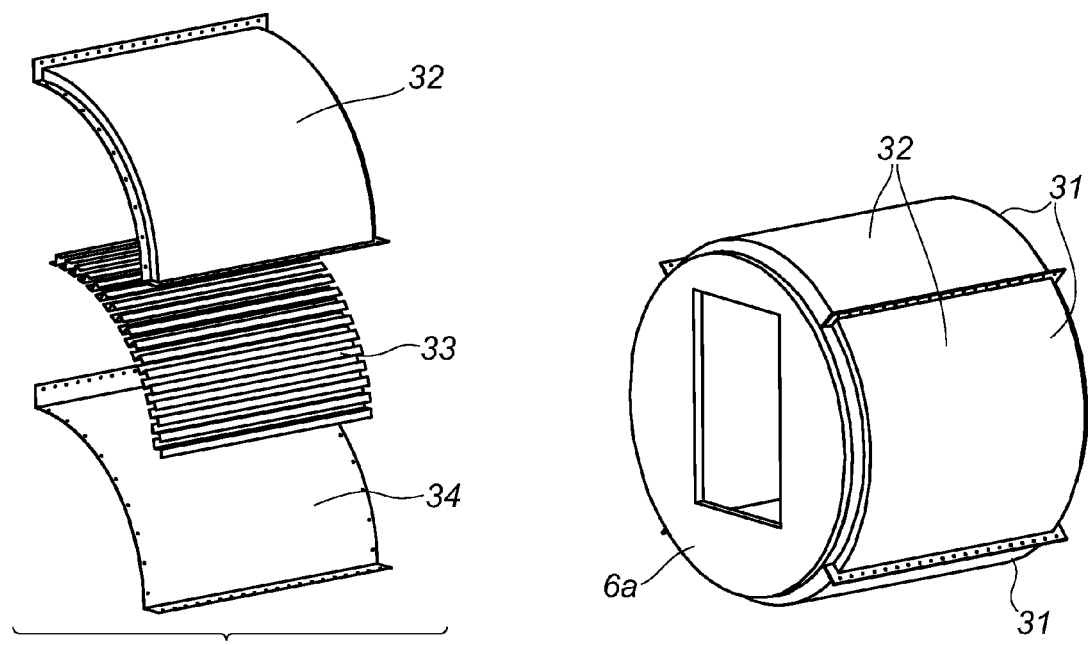
FIG. 6B
FIG. 6C

TIE DOWN ANCHOR

CROSS-REFERENCES TO RELATED APPLICATIONS

This application is a Divisional of Application No. 14/035,404 09/24/2013.

FIELD

The present invention is generally directed toward a storm shelter, and, more particularly, toward a self-contained personal protection, weather, and assault shelter.

BACKGROUND

Storm shelters are known in the prior art, and are typically found in areas that frequently are subject to severe weather, including thunderstorms, gusty winds, wind shear, hail, and tornados. Storm shelters are intended to minimize the risk of injury to the occupants by shielding them from falling limbs, precipitation, and even objects being hurled by wind forces.

Previously disclosed storm shelters were either intended for permanent installations or were too bulky to be transported easily.

SUMMARY

It is an objective of the present invention to provide for a stand-alone, self-contained, portable protection severe weather storm shelter. It is another object of the invention to provide a safe location from home invasions or animals The disclosed shelter is made of light-weight material and can be easily transported and set up with common handheld tools, as required. No other equipment or structure is required for complete protection against tornadoes, hurricane or dangerous winds. It is a further object of the present invention to provide portability through residential doors, hallways and stairs. It is still another objective to provide flexible site installations both indoors and outside. It is yet still another object of the invention that the shelter can be expanded to accommodate more occupants. It is another object of the present invention to allow for multiple configurations that have been certified as compliant with ICC-500 standards.

One embodiment of the shelter consists of two mounting supports, which are secured to the lower shelter member(s). Two seats may be installed in the lower shelter member(s) and then the upper shelter member(s) is bolted to the lower shelter member(s). An emergency hatch is installed from the inside. A rear panel is attached to the assembled shelter members. A front panel is attached to the assembled shelter members. The door frame assembly is secured to the front panel. The door assembly is attached to the door frame assembly. In one preferred aspect of the present invention, the door assembly contains the rotational/translational multi-pin lock assembly. This can be locked from the outside, but an emergency override pin on the inside is provided if the door becomes blocked or jammed by debris or other objects. In an example embodiment, anchor straps go over the shelter and are attached to a plurality of anchors, which are themselves secured into the ground. In another preferred aspect of the invention, the end (front and rear) panels are a corrugated metal assembly. In another preferred aspect of the invention, the shelter consists of four corrugated metal quarter panels with metal corrugated end (front and rear) panels.

In another example embodiment, the end (front and rear) panels are made of HDPE.

BRIEF DESCRIPTION OF THE DRAWINGS

Further advantages of the technology will become apparent by reference to the detailed description of preferred embodiments when considered in conjunction with the drawings:

FIG. 6A depicts an exploded view of an embodiment of the claimed invention with quarter panel assemblies 31.

FIG. 6B depicts an exploded view of a quarter panel assembly 31.

FIG. 6C depicts a view of an embodiment of the claimed invention assembled with a front panel 6a and quarter panel assemblies 31.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

We disclose a stand-alone, self-contained, portable shelter that provides protection from severe weather (such as tornadoes, hurricanes, and dangerous winds) and from home invasions. The shelter is unique in that it is a self-contained structure that is portable. It can be carried through residential doors, hallways, and stairs and, therefore, is amenable to indoor storage when not in use. The portability also leads to flexibility of site installations, allowing it to be placed in many different locations, such as in yards or indoors. It should also be appreciated that the unique design of the shelter allows it to survive F4 tornado and Category 4 hurricane force winds and debris. Other features, such as the three-point rotational, equi-translational pin door lock assembly, emergency lighting and emergency transponder, ensure that the shelter is strong, self-contained, and easily located.

Figure 1:
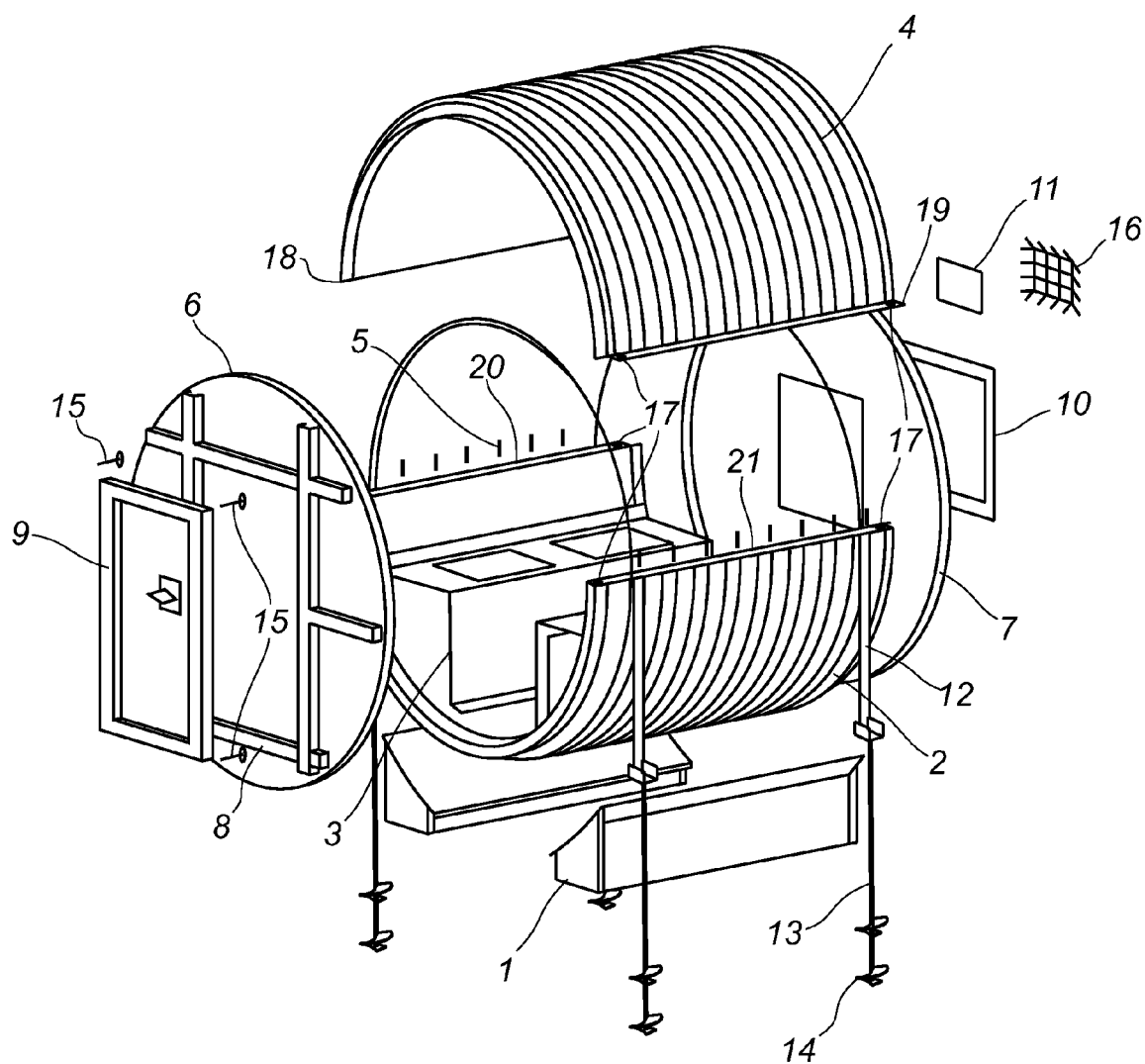
FIG. 1 depicts an exploded view of an embodiment of the claimed invention.
Figure 2:
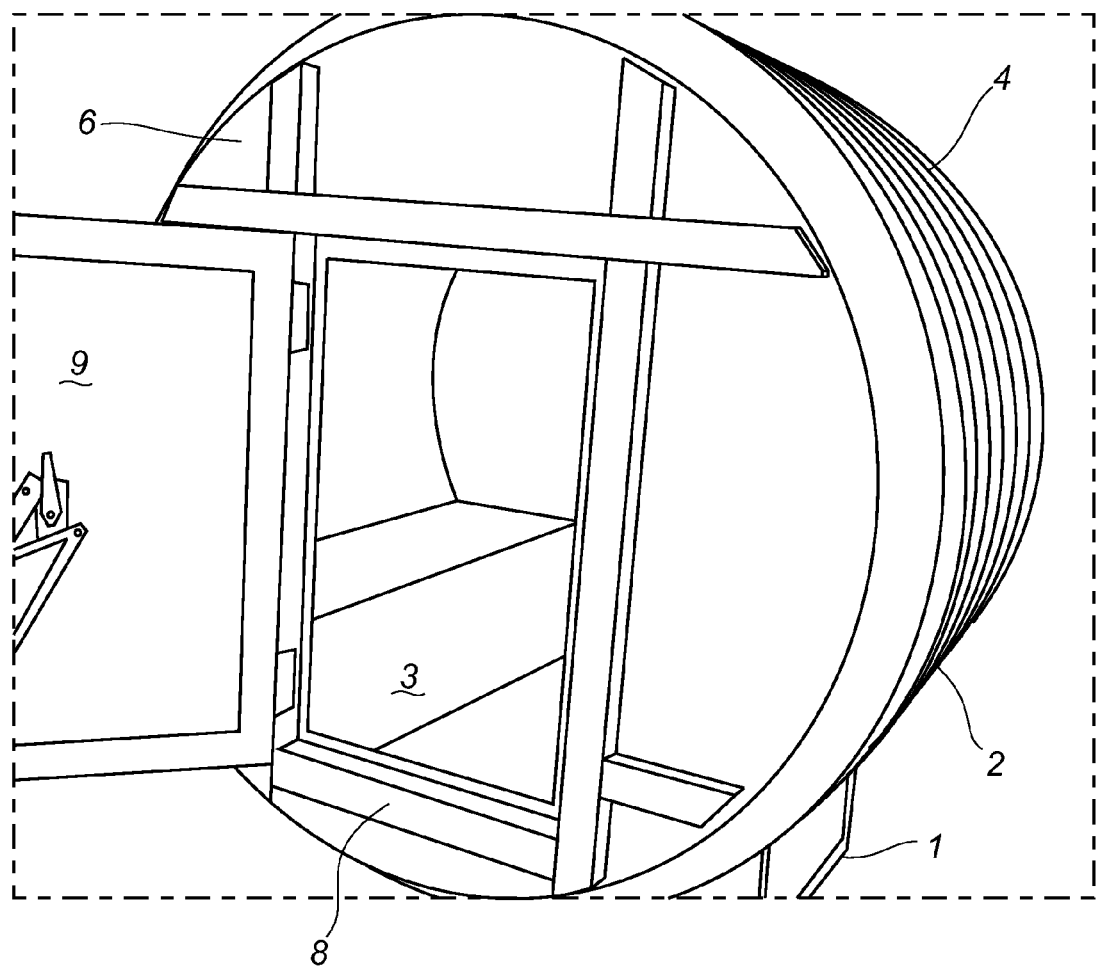
FIG. 2 depicts a complete embodiment of the claimed invention.

As will be appreciated from FIG. 1 and FIG. 2, one embodiment of the shelter unit is comprised of a tube-like structure consisting of a lower shell 2 and an upper shell 4. A front panel 6 and a rear panel 7 are positioned over the openings of the tube-like structure to provide a completely enclosed structure that is safe for occupants. In another embodiment of the invention, the shelter unit is comprised of four quarter panel assemblies 31, as shown in FIGS. 6A-6C.

Figure 5:
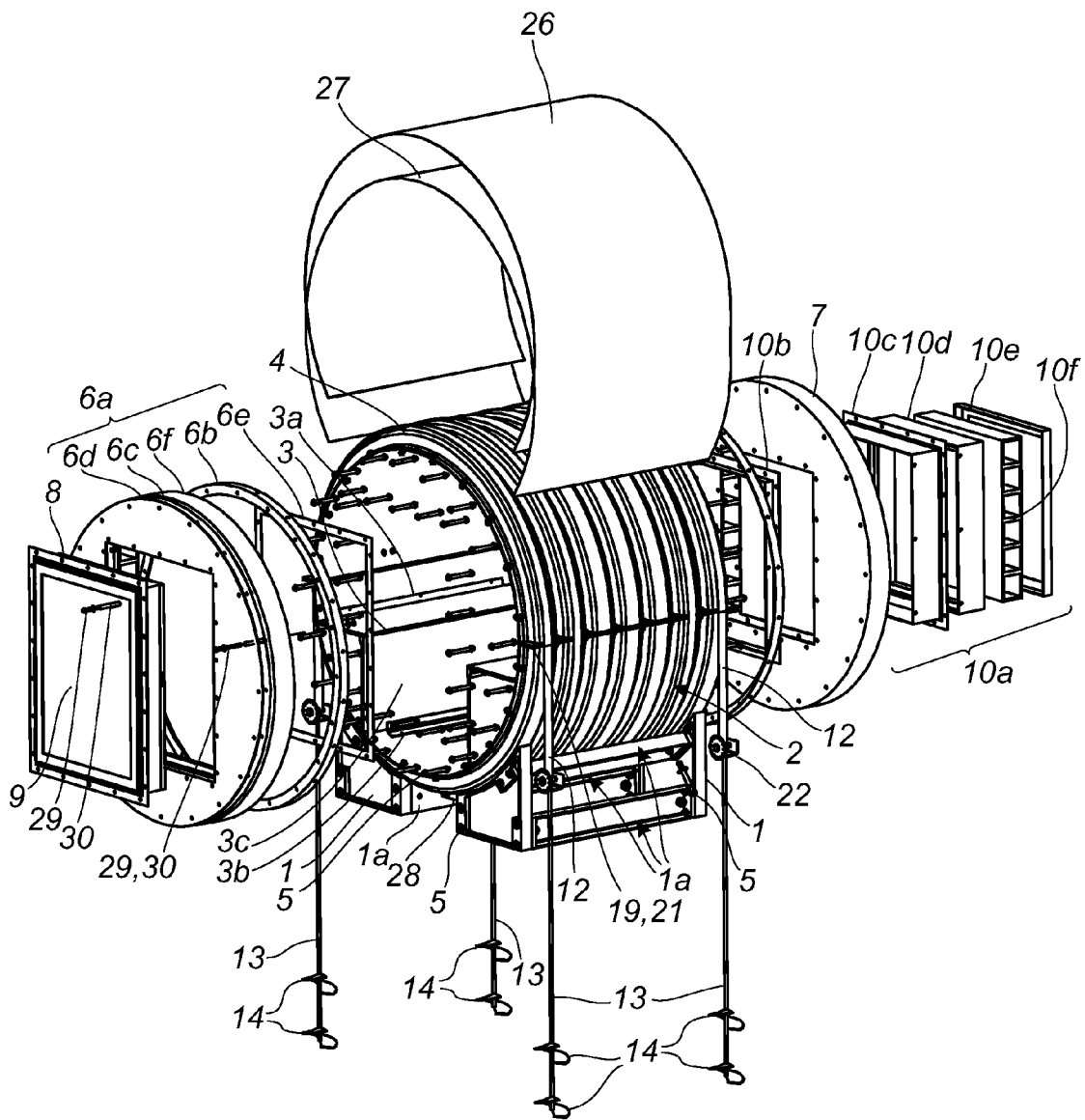
FIG. 5 depicts an exploded view of an embodiment of the claimed invention with wind shield 26 and impact shield 27.

Both, lower shell 2 and upper shell 4, are preferably made of a lightweight material, such as a plastic or other composite material, and may be corrugated to provide additional strength (as shown in FIGS. 1, 2, and 5). Injection of rigid foam can be considered to aid with internal stability of the corrugations or webs. Upper shell 4 is preferably approximately semicylindrical in shape and includes two mating surfaces, a left mating edge 18 and a right mating edge 19, configured to engage with corresponding mating surfaces on the lower shell 2. The curved arch-like shape of upper shell 4 intrinsically provides additional strength to prevent it from collapsing when hit from above with a heavy object. For added protection of the shelter, the occupants and for compliance with ICC-500 standards, optional wind shield 26 and optional impact shield 27 may be reversibly assembled onto the shelter. Wind shield 26 is preferably made of a rigid metal, such as stainless steel. Impact shield 27 is preferably made of an impact absorbing fabric or mesh. The optional shields 26,27 are preferably reversibly fastened to the shelter at shield restraint bracket 28 (shown in FIG. 5) and also held by anchor straps 12. For shelters constructed with quarter panel assemblies 31 (as shown in FIG. 6), the quarter panel assemblies 31 are constructed of an outer 32 and inner 34 stamped sheet metal members. In preferred embodiments, to add strength to quarter panel assemblies 31, a rolled or corrugated inner core 33 is provided between outer 32 and inner 34 stamped sheet metal members.

It is anticipated that lower shell 2 of a two shell assembly embodiment can be any shape. However, in a preferred embodiment, the lower shell 2 is also preferably semicylindrical in shape and also includes two mating surfaces, a left mating edge 20 and a right mating edge 21, that are configured to engage with corresponding mating surfaces on the upper shell 4. In this preferred embodiment, the upper shell 4 and lower shell 2 can nest within the other when the shelter is disassembled, thus allowing the shelter to take up less space in storage or when transported.

The lower shell 2 or quarter panel assembly 31 rests upon support base 1 forming a secure mounting platform for the shelter. Support base 1 is curved such that it interfaces with lower shell 2 and prevents the shelter from rolling. In a preferred embodiment, support base 1 is constructed of side panels and three support beams la. The support base 1 can be made of any hard material, but it is preferably made of a high-density plastic (e.g., HDPE) or rubber. The support base 1 may be securely but reversibly fastened to lower shell 2, preferably by use of fasteners, such as hex bolts 5. However, it is contemplated that the features of the terrain may be used to further secure the shelter. For example, when used on a steep hill, a single support base 1 may be used to prevent the shelter from rolling, but two may be required on level ground.

As depicted in FIG. 1, lower shell 2 preferably includes detachable seats 3 that provide a place for the occupants to comfortably sit. If one or more seats 3 are used, they will typically be installed prior to the attachment of upper shell 4 to lower shell 2. Seats 3 are preferably reversibly fastened to the interior of the shelter at upper seat clip 3a, and seat support 3c is reversibly fastened to the interior of the shelter at lower seat clip 3b. These clips 3a,3b are positioned to form the correct seating angle. Preferably, seat 3 is constructed to provide a hollow storage space that is accessible from within the shelter for holding water, food stuff, clothing, blankets, first aid supplies, flashlight, batteries, weather radio, and/or other emergency supplies.

The attachment of upper shell 4 to lower shell 2 is accomplished through the use of fasteners, such as hex bolts 5, which can be driven through holes in the upper shell 4 and received through holes in lower shell 2, and may be secured using matching nuts (not shown). In some embodiments, the fasteners are accessible only from the interior of the shelter. Quarter panel assemblies 31 are similarly attached to one another in those embodiments constructed of these.

After securing upper shell 4 to lower shell 2 (or quarter panel assemblies 31 to each other), front panel 6 and rear panel 7 are attached. Front panel 6 is configured to fully cover the opening formed by lower shell 2 and upper shell 4 when they are attached together. In preferred embodiments, in which both lower shell 2 and upper shell 4 are semicylinders or four quarter panel assemblies 31 are used, the front panel 6 is circular. Front panel 6 may be made of any rigid material, including wood and composites, but is preferably made of a high-density plastic, such as HDPE. Front panel 6 is strong enough to ensure that it can withstand an impact from debris being hurled by a tornado or hurricane as contemplated herein. Front panel 6 is attached to upper and lower shells (4 and 2, respectively) or other shelter unit configuration by use of a fastener, such as a flange bolt, but screws or other attachment means may also be employed. In some embodiments, the fasteners are accessible only from the interior of the shelter.

In other preferred embodiments (e.g., as shown in FIGS. 5 and 6), front panel assembly 6a is provided comprising front panel interface flange 6b, optional front panel impact shield 6c, optional front panel wind shield 6d, front panel inside mounting frame 6e, and front end main panel 6f. Optional front panel impact shield 6c and optional front panel wind shield 6d can be reversibly secured to front panel 6 or front panel assembly 6a, which provides for compliance with ICC-500 standards. Front panel interface flange 6b also provides proper alignment for the front panel assembly 6a to the shelter. An advantageous aspect of the front panel interface flange 6b is that it also allows expansion by joining together additional shelter units in a modular fashion. Thus, another advantage of the invention is the ability to mix and match different design cross sections as required by an individual user for a variety of needs or applications. Front panel 6 and front panel assembly 6a are securely but reversibly fastened to the shelter, preferably by use of fasteners, such as hex bolts 5.

Figure 3:
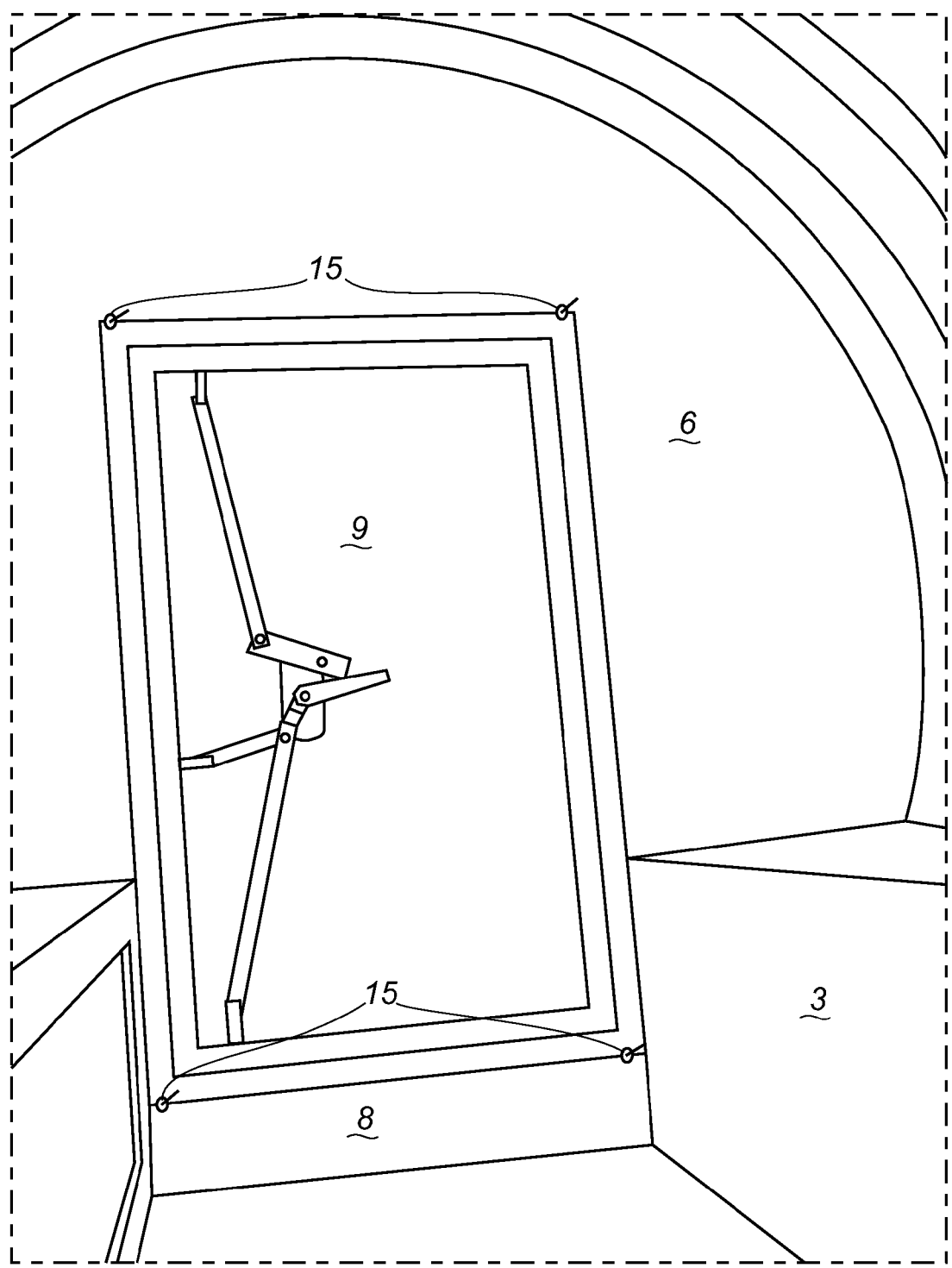
FIG. 3 depicts an embodiment of the claimed invention as viewed from the inside of the shelter facing the door.

Front panel 6 includes a rigid opening configured to accommodate a door assembly 9, which includes a door, frame, and a locking mechanism. In some embodiments, door assembly 9 further comprises hex bolts 29 with compression sleeves 30. The rigid opening is preferably rectangular in shape to match the door and is large enough to permit a person to enter the shelter. The door assembly 9 may already be mounted on said front panel 6, or an optional door frame assembly 8 may be attached to the front panel 6 using shear screws to facilitate attachment of the door assembly 9. As will be appreciated from a view of FIG. 3, the door assembly 9 also includes a rotational/translational multi-pin lock assembly. This lock assembly secures the door against the door frame assembly 8 at multiple points for added protection. This lock assembly can be secured from the outside of the shelter, but also operated from within the shelter using an emergency override clip(s) and pin(s) 15 located within the shelter. It is contemplated with the scope of the invention that the shelter can be built to ensure compliance with the Americans with Disabilities Act (ADA).

Rear panel 7 is attached to the shelter using flange bolts, (not shown). Like front panel 6, rear panel 7 is also made of a rigid material that can withstand impacts as expected during sustained or heavy gusts of wind. In a preferred embodiment, rear panel 7 is provided with a panel assembly as shown for front panel assembly 6a in FIG. 5, including, but not limited to, rear panel interface flange, optional rear panel impact shield (not shown), and optional rear panel wind shield (not shown). In these preferred embodiments, a rear panel interface flange also provides proper alignment for the rear panel assembly to the shelter. An advantageous aspect of the rear panel interface flange is that it also allows expansion by joining together additional shelter units. Rear panel 7 may include emergency hatch 10 that is installed from inside the shelter using rotational toggle levers. It is contemplated that the emergency hatch 10 can be used when egress from the door assembly 9 is blocked. In some preferred embodiments, as shown in FIG. 5, emergency hatch assembly 10a is provided comprising rear door mounting frame 10b, rear door frame 10c, rear panel frame 10d, rear panel retention frame 10e, and rear door panel 10f. A vent 11 may be installed in rear panel 7 to allow for the exchange of fresh air, as shown in FIG. 1. The vent 11 may also include a debris shield 16 to prevent debris from entering the shelter.

Figures 4A, 4B:
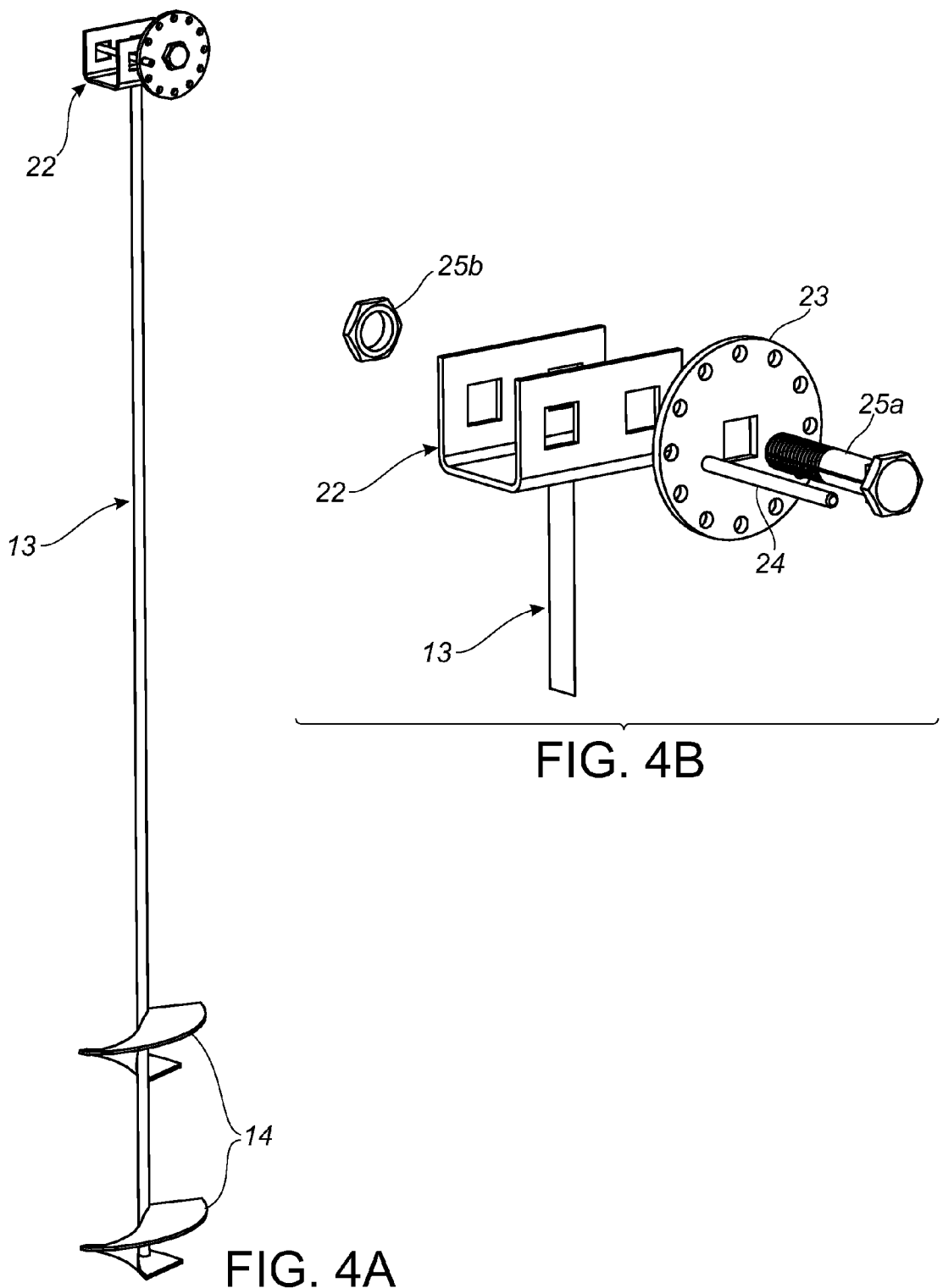
FIG. 4A depicts a detailed view of one embodiment of the anchor 13.
FIG. 4B depicts a detailed isometric exploded view of the anchor strap attachment/lock assembly 22 of anchor 13.

The entire shelter is secured in place by use of a plurality of anchors 13 and one or more anchor straps 12, as shown in FIGS. 1 and 5. Shown in more detail in FIG. 4A, the anchors 13 are made of a rigid metal, preferably stainless steel, and comprised of a metal rod having a wide helical external thread 14 at one end that can be driven into the ground like a screw by rotating the anchor 13. The end of the anchor 13 opposite the helical external thread 14 (i.e., the anchor strap attachment/lock assembly 22) may be slotted to accept a screwdriver or other tool to provide additional leverage when screwing the anchor 13 into the ground. Preferably, at least four anchors 13 are used. As shown in FIG. 4B, anchor strap attachment/lock assembly 22 is preferably comprised of a "u" shaped member for receiving anchor disc lock 23, anchor lock pin 24, and a fastener, such as slotted bolt 25a with matching nut 25b.

After the anchors 13 are secured to the ground, anchor strap 12 is passed over the shelter and is attached to anchors 13 on both sides of the shelter at anchor strap attachment/lock assembly 22. Alternatively, an anchor strap 12 can be secured to or near each corner of the shelter by passing the anchor strap 12 through an optional strap hole 17 constructed into lower shell 2, upper shell 4, or both at the mating edge. Anchor strap 12 is preferably made of a tough flexible material, such as nylon strapping or leather. In preferred embodiments, at least two anchor straps 12 are used per shelter unit/module to ensure that the shelter is adequately secured. The anchor straps 12 may additionally include a ratcheting or buckle mechanism to ensure that the shelter is firmly but reversibly secured to the ground.

An advantageous aspect of the present invention is the ability to apply a known and accurate tension preload to the anchor straps 12. This is critical to maintaining integrity in a 250 mph wind environment. As previously mentioned, the anchors 13 are secured to the anchor straps 12 using the anchor disc lock 23, anchor lock pin 24, and a fastener 25a,25b. As will be appreciated by a person of skill in the art, the anchor disc lock 23 and anchor lock pin 24 add precision tension capability not found in a standard DOT and HUD approved anchor. Thus, anchors 13 and anchor straps 12 can be used to better secure a mobile home or trailer as an anchor tie down, as inconsistent tension was sighted as a major problem in a recent FEMA Mitigation Assessment Team (MAT) report. The anchor 13 with anchor strap attachment/lock assembly 22, as shown in FIGS. 4A and 4B, includes two square bolt holes where a slotted bolt 25a is used to secure a tie down strap, such as a shelter anchor strap 12 or a mobile home tie down strap. The bolt 25a may only be rotated in 90° increments resulting in either too tight or too loose with the correct tension almost never achieved. To provide more accurate strap tension and be compatible with existing anchor systems, the following features and method has been developed by Applicants. First, the slotted bolt is removed from the strap (e.g., anchor strap 12 or a mobile home tie down strap) and anchor 13. The anchor disc lock 23 is placed against the anchor 13 frame at anchor strap attachment/lock assembly 22, and the slotted bolt 25a is reinstalled on the strap. The nut 25b is loosely attached to the slotted bolt 25a. Using a torque wrench, the bolt 25a is tightened until 35 ft-lbs is achieved. Next, advance to the next available disc hole on anchor disc lock 23 that aligns with the edge of the square hole to prevent it from back driving. Then, insert the anchor lock pin 24. Finally, the nut 25b is tightened to 35 ft-lbs. This results in a minimum strap tension of 1,680 lbs.

Once the shelter is fully secured to the ground, it is ready for occupants. The shelter may include additional emergency supplies such as interior lighting, emergency beacons, and camouflage.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

We claim:

1. A tie down anchor used in conjunction with an anchor strap to secure a shelter to the ground comprising: a rigid metal rod having a wide helical external thread at a first end and an anchor strap attachment/lock assembly at a second end, wherein the anchor strap attachment/lock assembly comprises a "u" shape frame having two sets of square bolt holes, an anchor disc lock, an anchor lock pin, a slotted bolt and a matching nut, wherein the anchor disc lock has one central square bolt hole located in the center of the anchor disc lock and a plurality of holes radially located around the perimeter of the anchor lock disc, the central hole of the anchor disc lock is configured to receive the slotted bolt, wherein the plurality of holes radially located near a perimeter of the anchor disc lock are each configured to receive the anchor lock pin, wherein upon assembly of the tie down anchor, the anchor disc lock abuts the "u" shape frame.

2. The tie down anchor of claim 1 wherein the anchor lock disc has twelve holes radially located around the perimeter of the anchor lock disc.

* * * * *